Figure 1:
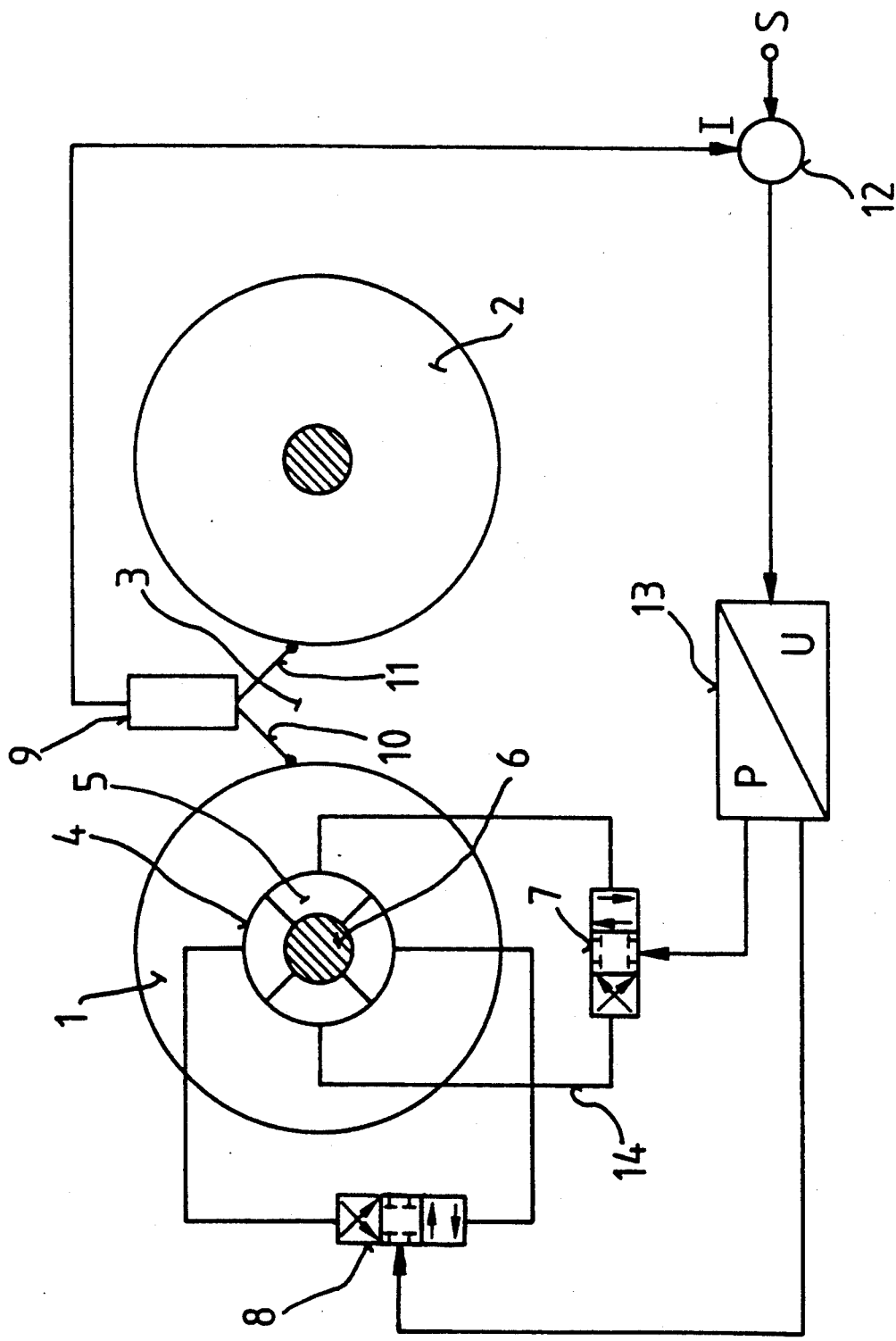

United States Patent [19]
Zimmermann et al.

[11] Patent Number: 5,201,586
[45] Date of Patent: Apr. 13, 1993

[54] ARRANGEMENT FOR THE DYNAMIC COMPENSATION OF ECCENTRICITIES OF SOLIDS OF ROTATION

[75] Inventors: Clifton Zimmermann, Karlsruhe; Norbert Holl, Battenberg; Helmut Lewin, Bobenheim-Roxheim; Juergen Wippel, Sinsheim, all of Fed. Rep. of Germany

[73] Assignee: BASF Aktiengesellschaft, Ludwigshafen, Fed. Rep. of Germany

[21] Appl. No.: 643,709

[22] Filed: Jan. 22, 1991

Related U.S. Application Data

[63] Continuation of Ser. No. 409,335, Sep. 19, 1989, abandoned.

Foreign Application Priority Data

Sep. 22, 1988 [DE] Fed. Rep. of Germany ....... 3832236

[51] Int. Cl.⁵ .............. F16C 23/10; F16C 32/04; B21B 31/26; B65H 20/00
[52] U.S. Cl. ..................... 384/247; 72/245; 82/903; 100/47; 100/170; 226/194; 384/1; 384/256; 384/448
[58] Field of Search .............. 384/99, 247, 252, 253, 384/257, 448, 519, 583, 256, 1; 226/181, 190, 194, 176, 177; 100/47, 162 B, 169, 170, 171; 72/245, 246; 82/903, 170; 73/865.9

[56] References Cited

U.S. PATENT DOCUMENTS

| | | | |
|---|---|---|---|
| 3,367,729 | 2/1968 | Korrenn et al. | 384/448 |
| 3,684,332 | 8/1972 | Benson et al. | 384/256 |
| 4,139,244 | 2/1979 | Guerguerian | 384/116 |
| 4,514,161 | 4/1985 | Winter | 384/256 X |
| 4,530,227 | 7/1985 | Schlatter et al. | 72/245 X |
| 4,545,625 | 10/1985 | Engwall | 384/100 X |
| 4,691,548 | 9/1987 | Richter et al. | 72/245 X |
| 4,699,050 | 10/1987 | Heise | 384/99 X |
| 4,905,598 | 3/1990 | Thomas et al. | 384/256 X |

FOREIGN PATENT DOCUMENTS

| | | | |
|---|---|---|---|
| 55-24228 | 2/1980 | Japan | 384/99 |
| 61-192924 | 8/1986 | Japan | 384/247 |
| WO83/04436 | 12/1983 | World Int. Prop. O. | |

*Primary Examiner*—Daniel P. Stodola
*Assistant Examiner*—William G. Battista, Jr.

[57] ABSTRACT

A measuring element which senses the running of the solid of rotation is connected to the actual value input of a controller whose output signal is connected to a control element which acts upon a bearing which is adjustable perpendicularly to the axis.

4 Claims, 2 Drawing Sheets

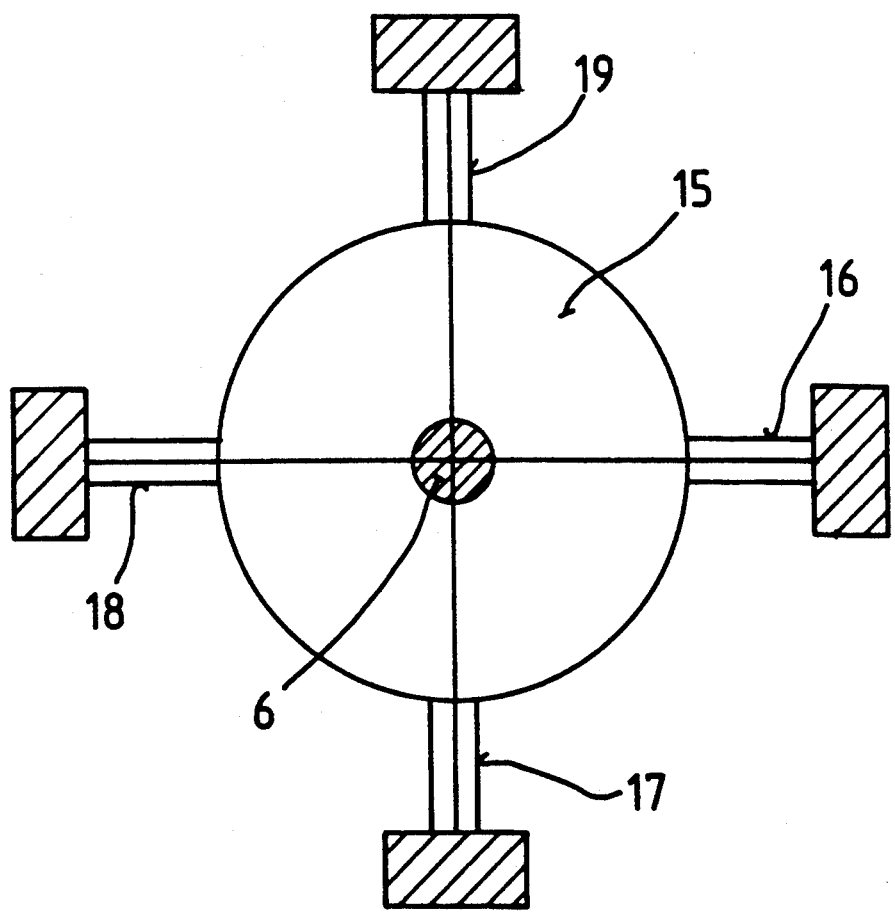

ARRANGEMENT FOR THE DYNAMIC COMPENSATION OF ECCENTRICITIES OF SOLIDS OF ROTATION

This application is a continuation of application Ser. No. 07/409,335, filed on Sep. 19, 1989, now abandoned.

The present invention relates to an arrangement for the dynamic compensation of eccentricities of solids of rotation.

The shape compliance of cylindrical or spherically symmetrical solids is limited by the manufacturing technique. Although compliances down to 2 μm (micrometers) are obtainable on modern precision machines even for rolls of large diameter, i.e. diameters above 10 cm, it is customary for the departure from the ideal circular shape to be significantly higher moreover, in operation inaccuracies in the bearings of rotating solids must be added to the shape deviations. In practice, rotating shafts must be expected to be eccentric by up to 10 μm (micrometers). This is much too high for precision machining equipment.

It is an object of the present invention substantially to compensate the shape and bearing eccentricities of solids of rotation.

We have found that this object is achieved by a feedback control arrangement comprising a measuring means which senses the running of the solid of rotation, a controller connected to the measuring means at the actual value input, and a control element which is actuated by the controller and which acts upon an adjustable bearing of the solid of rotation.

An illustrative embodiment of the arrangement according to the invention will now be described with reference to a schematic drawing, where FIG. 1 shows the arrangement according to the invention as a whole, and FIG. 2 shows an electromechanically adjustable roller bearing.

Two rolls 1 and 2 (FIG. 1) form a nip 3 which is to be kept at a constant width despite shape and bearing eccentricities of the rolls. To this end, one of the two rolls is supported at either end in a hydraulic bearing 4 so as to be slidable perpendicularly to the bearing axis. The bearing consists of four compartments 5 which are arranged in four quadrants and are filled with a pressure medium, for example oil, and which are sealed off by the shaft peg 6 at a distance from the compartment walls of from 20 to 100 μm (micrometers) and are connected via actuable fast-response servo-valves 7 and 8 to pressure sources. The other roll 2 is supported by roller or ball/bearings.

The shape and bearing eccentricities of the two rolls are compensated by the detection measurement of the eccentricities and the subsequent quasi-simultaneous feedback control adjustment of the position of the shaft of roll 1. The feedback control frequency can be up to 10 kHz.

The measuring means for the extremely accurate determination of the position of the roll surfaces at the point of interest consists of a sensor 9 comprising two mechanical sensor elements 10 and 11 in contact with the roll surfaces. These sensor elements 10 and 11 are connected to an electrical converter, so that an electrical signal corresponding to the distance between the rolls is generated by the difference measurement technique. Such sensors are commercially available, so that they need not be described here in any further detail.

The output of sensor 9 is connected to the actual value input (I) of a PID controller 12 which forms a correction signal from the distance signal and a target value (S) for the distance. The signals of the control system have a resolution of 12 bits, so that the control accuracy is extremely high.

The correction signal passes to a voltage/pressure converter 13 whose two output signals actuate the valves 7 and 8. The pressure in the compartments 5 of the hydrostatic bearing is adjusted via oil pressure lines 14 in accordance with the control signal. The response time of the control system is not more than 100 μs (micro-seconds), so that the delay is negligible.

Instead of the hydrostatic bearing it is also possible, as shown in FIG. 2, to use a bearing ring 15 which is slidable perpendicularly to the bearing axis and which holds the shaft ball-bearing. The bearing ring on the one hand is supported by two mutually perpendicular, spring-loaded bearing blocks 16 and 17 and on the other is connected to two correspondingly opposite, piezo-electric or magnetostrictive control elements 18 and 19. The control elements are actuated mutatis mutandis as described above via digital/analog converters.

A further possible use of the above-described arrangement is that, conversely, for example, the valves 7 and 8 are actuated via the voltage/pressure converter 13 with an actuating signal which in its time-course corresponds to a desired pattern of movement of the roll surface, in order for example to create a desirable microprofile on machining or polishing a workpiece rotating in place of the roll. By means of sensor 9 the profile of the workpiece can be monitored, and the valve control can be corrected via the controller 12.

The novel arrangement for compensating eccentricities has many possible uses, for example in precision lathes, coating machines, offset printing systems, calenders, rolling mills, surface processing machines, drills, engine shafts, wheel hubs, etc.

We claim:

1. An arrangement for keeping the nip between two rolls at a constant width comprising an adjustable bearing supporting one of said rolls at either end, said adjustable bearing is adjustable perpendicularly to its axis of rotation in a first direction toward and away from the other of said rolls as well as in a second direction perpendicular to said first direction, a measuring means which senses the running of the rolls at their peripheral surface, a controller which has an actual value input and a target value input, and which is connected to the measuring means at the actual value input, and a control element which is actuated by the controller and which acts upon said adjustable bearings so as to keep the width of said nip constant despite eccentricitites of the bearing supporting the rolls and of the shape of said rolls.

2. An arrangement as claimed in claim 1, wherein the adjustable bearing is formed by compartments which surround one end section of said roll in four quadrants and are filled with a pressure medium, the pressure in the individual compartments being adjustable by the control element.

3. An arrangement as claimed in claim 1, wherein the adjustable bearing is formed by a bearing ring which surrounds one end section of said roll and is slidable perpendicularly to the bearing axis and which is connected to at least two piezoelectric or magneto-strictive control elements which are arranged in two mutually perpendicular planes and are actuable by the controller.

4. An arrangement as claimed in claim 1, wherein the measuring means which senses the running of said roll is a mechanical-optical sensor.

* * * * *